United States Patent [19]
Code

[11] Patent Number: 6,022,037
[45] Date of Patent: Feb. 8, 2000

[54] MOTORBIKE RIDER TRAINING DEVICE FOR CORNERING

[76] Inventor: Keith Code, 255 Harlow Dr., Glendale, Calif. 91206

[21] Appl. No.: 08/991,889

[22] Filed: Dec. 16, 1997

[51] Int. Cl.$^7$ ........................................................ B62H 1/00
[52] U.S. Cl. .............................................................. 280/303
[58] Field of Search .................................. 280/755, 765.1, 280/767, 295, 304, 293, 43.17, 43.13, 301, 302, 303, 298, 300; 180/209, 24.01, 219, 24.03; 267/64.16

[56] References Cited

U.S. PATENT DOCUMENTS 4,133,402  1/1979  Soo Hoo ..................................... 180/30

*Primary Examiner*—Chris Schwartz
*Assistant Examiner*—C. T. Bartz

[57] ABSTRACT

A motorbike stabilizing device consisting of outriggers extending on both sides of the bike and connected pivotally and independently to the frame of the bike. A wheel is mounted near the tips of both structures which runs along the ground. An actuating lever located on the handlebars allows the rider to control the lean angle of the bike as it goes through a corner at various speeds and corner radii. The lever actuates a pneumatic cylinder which is connected to both structures keeping them firmly planted on the ground and allows the lean angle of the bike to be selected.

The invention assists the rider to overcome the natural fear of steep lean angles, the fear of quick or sudden turns and the fear of losing traction. The rider learns to lean his body with the bike in a turn, thus lowering the center of gravity of the bike/rider combination which creates the most stable conditions. The rider learns to set the correct turn radius as quickly as possible, so further corrections which create instability are not needed. Use of the invention quickly increases the rider's ability to predict the bike's path through a corner, thus increasing his safety and stability.

8 Claims, 1 Drawing Sheet

MOTORBIKE RIDER TRAINING DEVICE FOR CORNERING

BACKGROUND

1. Field of the Invention

The invention relates to a device for training motorbike riders and in particular to a device for varying the angle of lean of a motorbike, in a safe and controllable manner, as it turns through a corner. The present invention consists of two structural frames or outriggers, attached to either side of the bike extending out for a few feet with a wheel at the end of the outriggers which is in contact with the ground until the lean angle of the bike exceeds 40 degrees. The position and angle between these outriggers and the bike can be incrementally controlled by the rider by means of a lever mounted on the handlebars and controlling the pressure inside two shock struts attached to both outriggers and to the bike.

The addition and employment of the invention allows a novice rider to overcome the natural fear that exists when the rider has to lean the bike over while turning a corner or when the rider suddenly leans the bike over to change direction quickly as is necessary to avoid an object in front of the bike.

This natural fear that occurs when a novice is learning to ride a motorbike when turning into a corner is very real and must be overcome for the rider to become skilled at handling a bike under a wide variety of road conditions.

To traverse a right hand corner for example, the bike handlebars must first be turned to the left, away from the corner. This causes the bike to fall or lean to the right, due to centrifugal force generated on the bike and acting in a direction away from the center of rotation so as the bike leans to the right, the front wheel automatically turns around to the right and helps to set the cornering radius of the bike and the bike's lean angle, as it goes around the right hand corner.

Since the bike has two wheels, it must be leaned into the corner deliberately by the rider, to offset the centrifugal force which is trying to overturn the bike to the left. The tighter the radius of turn and the higher the road speed, the more that the bike must be leaned over, in some cases as much as 40 or 50 degrees from vertical. For most novice riders, there is a natural fear of leaning the bike too far thus bringing the bike and their body dangerously close to the ground.

There is also a fear of causing the bike to fall down or in the act of leaning far enough to make a turn, impacting some structural parts of the bike against the ground such as the foot-rest or oil-pan. If this impact occurs, then weight is transferred off the wheels and the tires can loose traction, causing the bike to fall over to the right, which may trap the rider's leg against the ground.

There is also the danger of a bike being leaned into a corner too much, causing the rear or front tire to slip and turn the bike further into the corner. The rear or front tire may then regrip the road surface, creating a very strong force which tries to straighten the bike up and which can 'high-side' the rider.

The definition of 'high-side' as used in the disclosure is the action of a two-wheeled bike going through a corner and the front or rear wheel (or both) slips away from the cornering center then suddenly regrips the road surface, generating a large reaction force which acts to rotate the bike towards its vertical axis and which can be sufficiently strong to throw the rider off the bike.

The definition of 'low-side' as used in the disclosure is the action of a two-wheeled bike going through a corner and the front or rear wheel (or both) slips away from the cornering center causing the bike to fall down.

The definition of lean angle is the angle from a line perpendicular to the ground of the bike's vertical axis as the bike leans over during a turn.

Another natural fear that exists for the rider, when trying to avoid an obstacle in front of the bike and quickly turning the bike to either side, and so causing it to fall over. These fears are of course enhanced in any reduced traction conditions.

Because of the nature of the dynamic forces acting on a motorbike as it goes through a corner at speed, and the inability of the bike's structure, to counteract these forces, it is necessary for the rider to learn to balance these forces by leaning the bike and his body towards or into the corner. If not done correctly, there is a considerable risk of the bike's tires loosing traction on the road or track surfaces allowing the bike to go into a skid and 'high-siding' or 'low-siding' the rider.

Leaning one's body with a bike into a corner runs counter to all basic instincts for the rider's safety as the preference is to maintain the body in a position close to vertical. To efficiently ride and maneuver a bike the rider must learn to lean his body with the bike and overcome this strong survival instinct.

The present invention is designed to teach the rider how to overcome this instinct and lean through a corner correctly at different speeds and corner radii and so allows him to gain confidence in his riding skills while eliminating many of the dangers described herein. The invention also allows the rider to overcome the fear of leaning his body over with the bike in a corner instead of trying to maintain his body in an upright position, which requires leaning the bike further over than is necessary. This has the advantage of less bike lean angle in a turn hence better use of the correct tire surface which creates a better traction situation. It also requires less work from the rider as he does not have to force the wheel over to get the correct lean angle, instead he uses his body to work with the bike to get the best lean angle. Another advantage of this correct lean angle is that in an accident situation, the rider can respond faster to the situation and turn the bike more quickly and so avoid a collision.

It is very important for the rider to learn to set the correct lean angle and hence turn radius at the start of the turn through a corner as quickly as possible so corrections are kept to a minimum. Each correction made through a turn creates a degree of instability of the bike and rider with a resultant reduction in traction. By overcoming the rider's fear of leaning the bike quickly and through steep lean angles, this allows the rider to quickly set the correct lean angle and so go through the corner in the best and safest possible manner.

2. Description of Related Art

There are a number of existing designs in the art where extra structures and wheels are added to a basic 2-wheeled bike. For instance, side-cars have been in use for some time and are added to transport another passenger or to carry payloads. Side-cars are fixed rigidly to the bike frame and although they add lateral stability to the bike, this is a secondary factor. Further, a side-car is only added to one side of the bike unlike the present invention which adds a structure to both sides of the bike.

In the case of a motorbike and side-car, the sidecar supplies a lot of the stability that is missing in a two wheeled vehicle and creates a much more stable platform for the rider. However the side-car is fixed to the side of the bicycle and does not move or rotate relative to the bike as the bike goes through a corner. The vertical center of gravity of the bike/side-car combination lies between the 3 wheels and so creates a moment (weight times distance) that counteracts the induced centrifugal force and subsequent moment created in the horizontal direction as the bike/side-car goes through a corner at speed. Also, unlike the present invention, the sidecar does not assist in the training of a bike rider who is learning to ride a bike with two wheels round a corner. As he is going through turns and corners on a bike, he must learn how much to lean the bike as he goes through the corner.

Further, a bike with side-car is designed to be a freestanding system, while the present invention applied to a 2 wheeled bike will allow the bike to lean over to either side. In the case of a bike plus side-car the bike cannot be leaned through corners, as the 3 wheels contacting the road act as a stable platform and lateral centrifugal forces are usually not sufficient to raise the side-car wheel off the ground, which would allow the bike to lean. This is especially true if a passenger is sitting in the sidecar or a payload is being carried.

Training wheels are also known in the art and can be used on a bike but they are generally rigidly fixed to the bike frame and while the bike is driven, They are used to limit lean angle of the bike to the angle set before they contact the ground. They do not include any of the control or incremental training features of the present invention.

Also known in the art is the BMW (Bavarian Motor Works) design of outriggers which are attached to the bike frame similar to the present invention, but they are positioned in a fixed relation to the bike frame with wheels attached to the ends of each outrigger, which have a space between both of the wheels and the ground while the bike is moving in a straight line. When the bike is leaned over sufficiently in a corner, one of the outrigger wheels touches the ground and so limits the amount of lean.

A shock absorber is also used in the design but only to reduce the impact forces in the case of a sudden lean that allows the outrigger wheel to hit hard on the road or track surface. This device is designed mainly to measure wet weather traction forces on different types of tires. It has no capacity to allow incremental lean angle changes to the system and can not be used for quick turn and steep lean angle tests as can be done by the present invention.

The BMW bike outriggers could high-side the rider in a corner, as they did not have close contact maintained between the outrigger wheels and the road as in the present invention.

There is nothing in the prior art that allows the rider to overcome his fears in the manner of the present invention. The performance of the present invention can also be easily adjusted by changing orifice sizes in the hydraulic cylinders which control the force required to change the lean angle for the rider. Thus control features of the invention can be changed to match the rider's confidence level as he improves his skills.

SUMMARY OF THE INVENTION

It is important that the rider learns how to lean a bike in a corner, become familiar with traction limits while cornering and to be able to safely turn quickly to avoid accidents. In accident avoidance at high speed bike riders must be able to quickly lean the bike to either side to get around objects in the road or track. The faster one approaches a turn on a bike the further one has to lean the bike over to go through the turn.

More than 50% of bike street accidents are caused by motorists turning their cars towards the left in front of a bike going the other way. If the rider is afraid of quick turns his only choice is to try to brake to avoid the accident which often is not enough. Similarly with road hazards, and items falling off a truck or van which fall into the road in front of the bike, requiring the need for speedy and evasive action.

Against all instinct when going through a corner in the wet, under power, if the rear wheel slips, the first impulse of the novice rider is the cut the throttle which causes the rear wheel to slip to the opposite side of the turn and once the wheel regrips the surface, the large sudden braking force can easily throw the rider off the bike up into the air as the bike straightens up. The present invention trains the rider to correctly lean the bike into the corner thus minimizing the possibility of a slip. He is trained to maintain the throttle position despite side slip and so he can maintain the slip through the corner or in the extreme case induce a low side fall, which is a better alternative than a high side crash.

Unlike the limitations of the other inventions noted in the art, the present invention allows the rider to press and release a pressure bleed lever located on the handlebars, which releases air by opening a valve inside a bypass line from the top to the bottom of a control cylinder attached to the two structures, thus allowing the bike to lean further to the side in a controlled, incremental manner. When the lever is released, the rider feels a reassuring resistance to any further lean as the bike now continues to lean very slowly, as oil bleeds through the orifice hole inside the cylinder. Furthermore there is a maximum lean set in the invention which ensures that no part of the bike can hit the ground. This reassurance to the rider allows them to experiment with lean angles in turns with much greater confidence and so speeds up their training in this important skill.

DETAILED DESCRIPTION OF THE INVENTION

Figure 1:
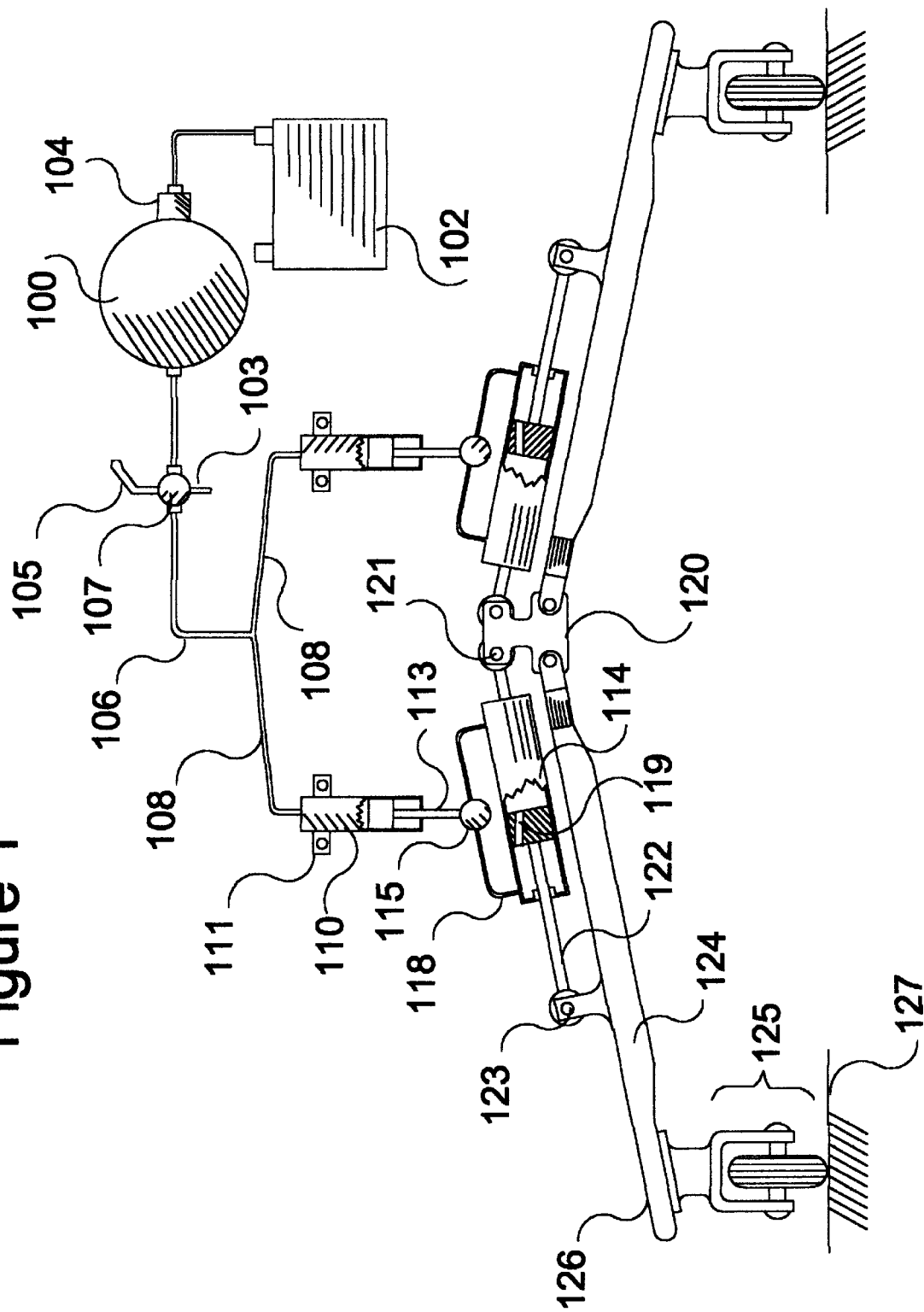
FIG. 1 is an overall view of the device.

FIG. 1 of the present invention shows a schematic layout of the main components of the present invention. The system uses compressed air supplied by an air pump (100) driven by electric current drawn from the motorbike battery (102). The air pump (100) is first switched on by a manual switch (104) and the pump (100) compresses ambient air and feeds it under pressure, into a first pressure line (106) connected to two pressure lines (108). Both of these pressure lines (108) are connected to air piston cylinders (110). A lever (105) connected to the handlebar of the bike (not shown) and contains a valve (107) which is fitted into pressure line (106). The air piston cylinders (110) are bolted to the frame of the bike (not shown) by bolts (111). The air cylinder pistons (113) are connected to ball valves (115) located in two oil bypass lines (118). The bypass lines are connected through the wall of two hydraulic piston cylinders (114). When the ball valves (115) are closed, no hydraulic oil can flow in either direction through the bypass lines (118). Thus any attempt to lean the bike will cause the hydraulic oil to be forced through small orifices (119) which creates resistance to the leaning force applied by the rider to the bike.

The hydraulic cylinders are attached through pinned joints (121) at one end, to a pillar (120) which is rigidly attached to the frame of the bike (not shown). The pistons (122) extending out from the hydraulic cylinders (114) are attached by pins (123) to the two outriggers (124). The outriggers (124) are also pinned at one end to the pillar (120) which in turn is rigidly attached to the bike frame (not shown). Two wheels (125) are attached to the ends of the outriggers (126) and contact the ground (127).

When the lever (105) is depressed, the bleed valve (107) opens and some of the compressed air inside the cylinder (110) leaks out through the pressure lines (108 and 106) through the bleed valve (107) to the outside air, through exit line (103) thus reducing the pressure inside the cylinder (110). This drop in air pressure allows the hydraulic system bypass valves (115) to open which in turn then allows oil to escape from the hydraulic cylinders (110) through the bypass lines (118) and into the back of the cylinders (114). As the hydraulic cylinder piston (122) moves inside the cylinder (114) the bike can lean further over as desired by the rider.

When the lever (105) is released by the rider, the air pressure is restored quickly by the pump (100) and the bypass valve (107) is closed. The rider can continue to lean the bike, but now the lean is controlled by the small orifice valves (119) inside the hydraulic cylinders (114) which requires some force to overcome and offers considerable resistance to further lean of the bike.

This resistance gives the rider a feeling of security and safety as the bike cannot now be suddenly leaned over without his control. This same mechanism is repeated on the other side of the bike. The rear frame of the outrigger (124) is attached to the bike frame at two points not shown and aligned with each other and pinned so that the entire outrigger structure can rotate freely upwards and downwards.

EXAMPLE

In an example of the present invention, two outrigger structures were manufactured and attached to the frame of a Kawasaki ZX6R racing bike. An air pump was installed under the seat of the bike and a pressure line was run to a lever operated valve installed to the handlebars in reach of the riders hand. A pressure line was run down from the lever valve outlet to an air piston installed on a metal pillar attached to the bike lower frame. A separate mounting plate was installed underneath the oil pan of the bike gearbox and carried the rear connecting points for the outriggers. The outriggers were welded out of thin walled tubing. Small wheels were attached at the extremities of the outriggers. As described in the schematic above the necessary pressure lines and hydraulic cylinders were installed and connected together.

The bike with the outriggers and other components installed, was driven around a track and as the bike was cornered, the lever was depressed and the bike leaned over. Release of the lever fixed the lean angle and the slow bleak of oil through the bleed valve in the shock strut cylinder created a noticeable and satisfactory resistance against further lean of the bike. As the bike continued around the corner, both outrigger wheels were in contact with the track surface and the whole bike and outrigger system felt very stable.

Objects and Advantages

In summary the objects and advantages of the present invention are that its use permits the rider to overcome his natural fear and to safely experience a broad envelope of bike maneuverability, quickly, safely and with confidence.

In particular the objects and advantages of the invention are to help the rider overcome the natural fear of steep lean angles, the fear of quick or sudden turns and the fear of losing traction. Further objects and advantages are that the rider learns to lean his body with the bike in a turn, thus lowering the center of gravity of the bike/rider combination which creates the most stable conditions. Another object and advantage is to train the rider to set the correct turn radius as quickly as possible, so further corrections which create instability are not needed. Another object and advantage of the invention is to increase the rider's prediction of the bike's path through a corner, thus increasing his safety and stability.

Another object and advantage is to train the rider to retain his throttle on position in cases of rear wheel slip caused by overpowering the traction limit of the rear tire in a cornering situation, and to learn to raise the bike towards a more vertical position in order to regain traction and reduce the potential of a high side crash.

What is claimed is:

1. A motor bike outrigger comprising;
    a) at least one structure adapted to be pivotally attached to a frame of a motor bike having a plurality of wheels at a plurality of locations; said at least one structure adapted to extend laterally to the direction of travel of said motor bike when said wheels are rolling;
    b) said at least one structure having a proximal end adapted to be pivotally attached to said frame of said motor bike, said at least one structure also having a distal end, said at least one structure also having a training wheel attached at the lower surface at said distal end thereof, said training wheel being adapted to contact the ground;
    c) said one structure further comprising:
        a) a hydraulic cylinder having a first end adapted to be pivotally attached to said frame of the motor bike, said hydraulic cylinder further having a piston positioned internally and surrounded by said hydraulic cylinder, said piston being movable with respect to the first end of said hydraulic cylinder and further having a one end of a piston rod attached to said piston, the other end of said piston rod extending outside said hydraulic cylinder and further being attached to the distal end of said a least one structure, said hydraulic cylinder having a second end opposite said first end, said hydraulic cylinder having an orifice at each of said first and said second end, whereby said piston may be moved within said hydraulic cylinder by the action of a fluid passing through the orifices;
        b) a bypass line having a bypass valve controlling the passage of fluid flowing between said orifices;
        c) said fluid further being capable of flowing between said opposite sides of said piston by means of a control orifice within the piston;
        d) said valve controlled by an air supply line;
        e) a lever, said air supply line being controlled by said lever and said lever adapted to be attached to said motor bike.

2. A motor bike outrigger as in claim 1, further comprising two outriggers, each one adapted to be attached to opposing sides of said motor bike.

3. A motor bike outrigger as in claim 2, capable of providing a correct turn radius.

4. A motor bike outrigger as in claim 1, wherein said outrigger is made of metal.

5. A motor bike outrigger as in claim 1, wherein said outrigger is made of composite material.

6. A motor bike outrigger as in claim 1, wherein said outrigger is made of plastic.

7. A motor bike outrigger as in claim 1, wherein said outrigger is constructed in a manner which will minimize air resistance.

8. A motor bike outrigger as in claim 1, wherein said training wheel may alternatively be a skid.

* * * * *